June 17, 1941. H. R. AUSMAN 2,245,552
NUT LOCK
Filed Sept. 12, 1938
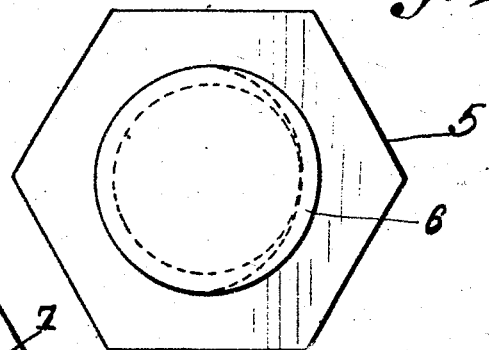
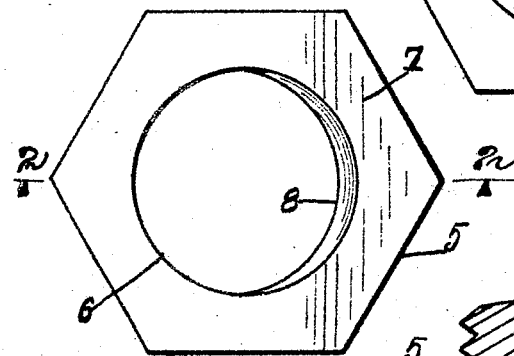
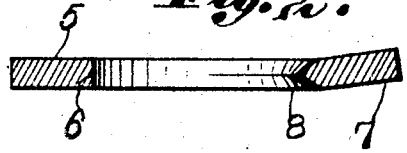
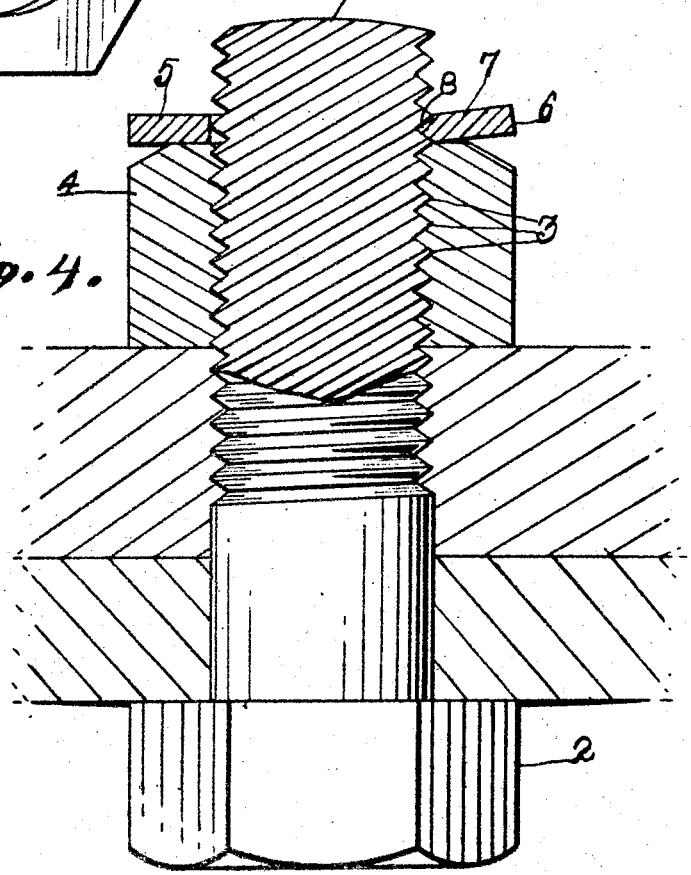
INVENTOR.

Patented June 17, 1941

2,245,552

UNITED STATES PATENT OFFICE 2,245,552

NUT LOCK

Harry R. Ausman, Milwaukee, Wis., assignor of two-thirds to Joseph M. Picker and Rudolf W. Riegner, both of Milwaukee, Wis.

Application September 12, 1938, Serial No. 229,521

1 Claim. (Cl. 151—30)

The present invention relates to improvements in nut locks and particularly to a locking disk arranged on the bolt adjacent the outer face of the nut to resist retrograde movement of the nut on the bolt.

The object of the invention is to provide a nut locking disk having a tapered bite portion adapted to readily engage the threads of the bolt adjacent the outer face of the nut and have binding engagement with the threads of the bolt and hold the nut against retrograde movement on the bolt.

Another object of the invention is to provide a nut locking disk having an angular portion at one side thereof with an interior tapered bite portion, so that when the disk is arranged over a bolt a good portion of the disk lies flat against the outer face of the nut to receive the action upon retrograde movement of the nut whereby a reaction will occur at the bite portion causing the same to be drawn into binding engagement with the threads of the bolt to securely hold the nut against further movement.

A further object of the invention is to provide a simple and effective locking disk which can be quickly and easily placed in position on the bolt adjacent the nut and which can be manufactured very cheaply.

With the above and other objects in view the invention consists in the combination and arrangement of parts hereinafter more fully described, pointed out in the claim and shown in the accompanying drawing, in which—

Figure 1 is an end view of a bolt showing my lock engaged therewith. Figure 2 is a cross section of the lock taken on the line 2—2 of Figure 3. Figure 3 is a plan view of the lock nut itself and Figure 4 is a partial section of a bolt showing the nut and lock in cross section with the lock in locking position.

In the accompanying drawing a bolt 1 is shown which may be of any size or design and provided at one end with the usual head 2 and the other end provided with the screw threads 3 which may be of any size or design of a conventional type.

Threaded onto the threaded end of the bolt is a nut 4 which may be of any conventional type and arranged over the outer end of the bolt and engaged with the outer face of the nut 4 is my improved locking disk 5.

In the present instance I have illustrated a hexagonal nut 4 and a hexagonal disk 5 although any shape can be used, and the disk is provided with a substantially central opening 6. One side of the disk is disposed at a slight angle as shown at 7 and at the inner side of the angular portion there is provided a tapered bite portion 8 which is adapted for engagement with the threads 3 of the bolt 1 as shown in Figure 2 to retain the nut 4 against retrograde movement.

In the formation of the bite portion 8 it will be noted that the lower inclined face is somewhat shorter than the upper face, with the longer upper face adapted for direct contact with the lower face of the screw threads of the bolt as shown in Figure 2.

In the use of the nut lock the nut 4 is threaded onto the bolt tightly against the object to be held in place, the locking disk is then moved inwardly over the threaded end of the bolt toward the nut until the disk is in direct contact with the outer face of the nut and with the bite portion 8 engaging the threads of the bolt as shown in Figure 2. It will be noted that when the disk 5 is in engagement with the nut 4 the angular portion 7 is spaced from the nut while the main portion of the washer, and particularly that portion directly opposite the angular portion, is in direct contact with the nut 4 as clearly shown in Figure 2.

From the above description it will be apparent that upon any retrograde movement of the nut 4 direct action will take place at the point (a) where the disk is in direct contact with the nut 4 causing this portion of the disk to move slightly outwardly with the nut causing a reaction to take place at the point where the bite portion 8 engages the threads of the bolt. This latter action causes the angular portion 7 to be moved inwardly toward the nut and simultaneously causing the bite portion to be forced inwardly into tight fitting contact with the threads of the bolt and the longer face of the bite portion presents a comparatively full face contact with the under face of one of the threads of the bolt whereby the largest surface possible of the bite portion takes the stress of the outward movement of the nut and will securely hold the nut against further retrograde movement.

Attention is particularly called to the action of the locking disk 5 upon any retrograde movement of nut 4 wherein the side in contact with the nut will be moved slightly outward and drawing the bite portion 8 into tight direct contact with the threads of the bolt and thus the more stress against the disk the tighter the bite portion will engage the threads securely holding the nut against further retrograde movement of the nut 4.

In the accompanying drawing the nut as well as the disk is shown hexagonal in shape, but it will be apparent that any shape can be used equally as well, in fact the lock disk 5 may be circular in shape and the disk forced into locking position with any suitable type of tool.

This type of locking disk can be manufactured at an extremely low cost, but will be very effective for the purpose intended, and due to the simplicity of the disk and the fact that it can be produced so cheaply it can easily replace the well known cotter pin and the like with more effectiveness.

While I have shown and described the preferred embodiment of my invention it will be apparent that various changes can be made when putting the invention into practice without departing from the spirit of the invention or the scope of the appended claim.

What I claim is:

A locking disk having a substantially central opening, an angular portion at one side of the disk, a tapered bite portion at one side of the opening and the remaining wall of the opening having an unbroken surface, the center of said bite portion being substantially the center of the angular portion, and said bite portion extending circumferentially of the opening with one of its tapered faces longer than the other.

HARRY R. AUSMAN.